May 26, 1964 — E. E. BALL, JR — 3,134,223
TAPE SHIELDED NOZZLE
Filed March 6, 1961 — 2 Sheets-Sheet 1

INVENTOR.
EUGENE E. BALL, JR.
BY Herbert E. Kidder
AGENT

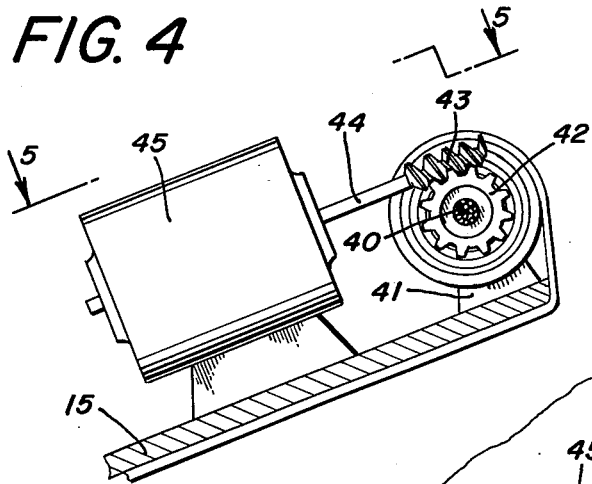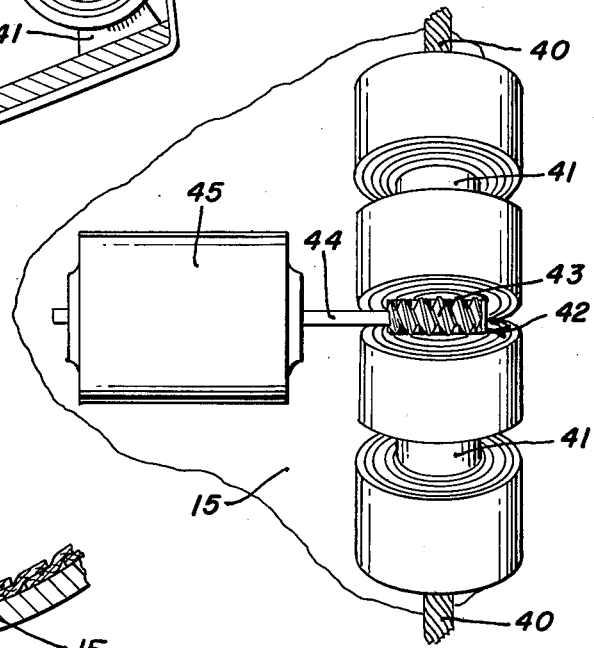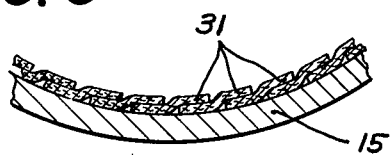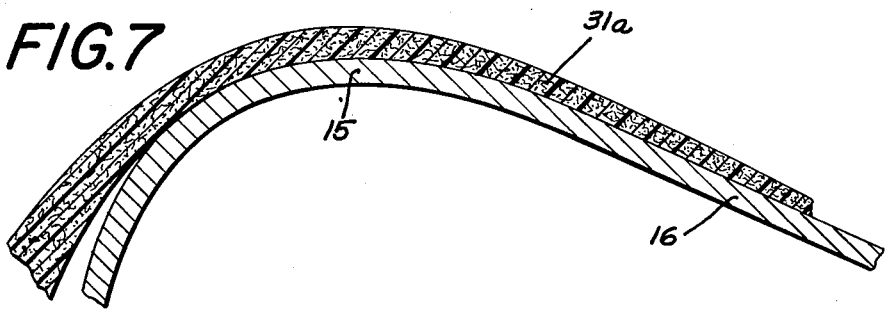

United States Patent Office 3,134,223
Patented May 26, 1964

3,134,223
TAPE SHIELDED NOZZLE
Eugene E. Ball, Jr., Redlands, Calif., assignor, by mesne assignments, to Lockheed Aircraft Corporation, Burbank, Calif., a corporation of California
Filed Mar. 6, 1961, Ser. No. 93,559
9 Claims. (Cl. 60—35.6)

The present invention relates to rocket motors, and more specifically to a unique form of nozzle construction designed to withstand the high temperature blast of combustion products without erosion, and having certain other advantages which will be described hereinafter.

The primary object of the present invention is to provide a rocket motor nozzle having a protective shielding on the inner surface thereof which protects the nozzle against the erosive action of hot combustion gases issuing from the nozzle at supersonic velocity.

Another object of the invention is to provide a low-cost rocket motor nozzle, which does not require the use of expensive high temperature resistant metals, ceramics, or cemented aggregates.

Another object is to provide a nozzle which can be made extremely light in weight for a given rocket motor, thereby reducing the total dead weight of the rocket motor.

A further object of the invention is to provide a rocket motor nozzle of improved reliability and efficiency, by eliminating the adverse effects of erosion.

Still a further object of the invention is to provide a nozzle having means for varying the nozzle throat diameter for the purpose of modulating the thrust according to a predetermined program.

These objects are achieved by utilizing a plurality of tapes of heat resistant material, such as woven fiberglass or the like, which are disposed around the inner surface of the nozzle so as to cover the same and shield it against the hot combustion gases issuing from the nozzle. The tapes are wound on supply spools, or bobbins, which are contained within a protected storage area, and these tapes are caused to move rearwardly through the nozzle during the burning period of the rocket, so that fresh tape is drawn from the protected storage area to replace the tape that has been exposed to the hot combustion gases before the exposed tape has been destroyed. One advantageous feature of this arrangement is that the tapes overlap one another in the restricted throat section of the nozzle, and thus provide a double thickness of shielding material in this critical area, where the temperature is highest.

The foregoing and other objects and advantages of the present invention will become apparent to those skilled in the art upon consideration of the following detailed description of the preferred embodiment thereof, reference being had to the accompanying drawings, wherein;

FIGURE 4 is an enlarged fragmentary view of the means for drawing heat resistant tapes through the nozzle;

FIGURE 5 is a top plan view of the detail shown in FIGURE 4;

FIGURE 6 is an enlarged fragmentary sectional view, taken at 6—6 in FIGURE 1; and FIGURE 7 is an enlarged fragmentary sectional view, taken at the nozzle throat, showing a portion of tape of varying thickness, which has the function of varying the throat diameter to modulate the thrust.

Figure 1:
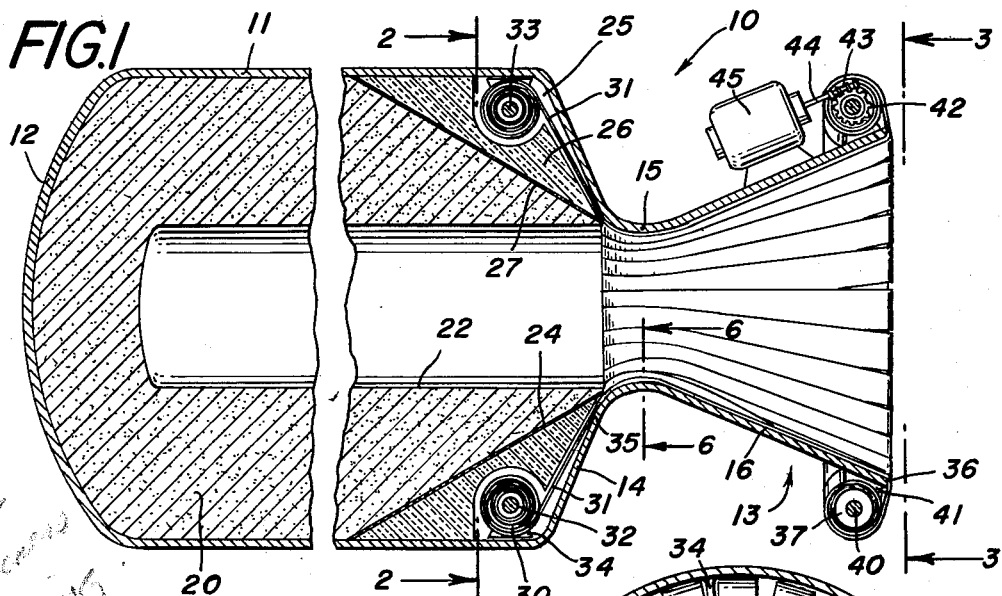
FIGURE 1 is a longitudinally sectioned view of a rocket motor having a nozzle embodying the principles of the present invention.
Figure 2:
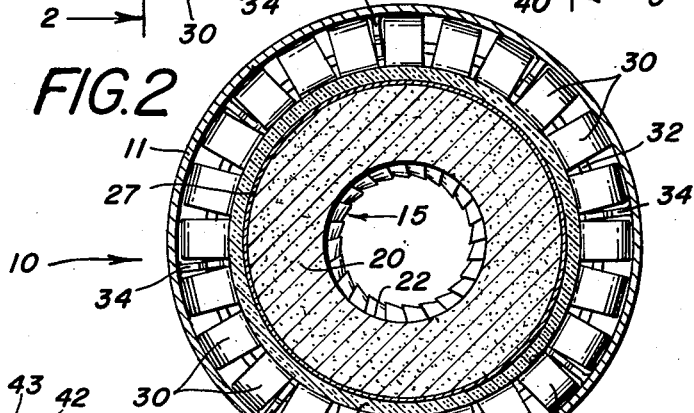
FIGURE 2 is a transverse sectional view through the same, taken at 2—2 in FIGURE 1.
Figure 3:
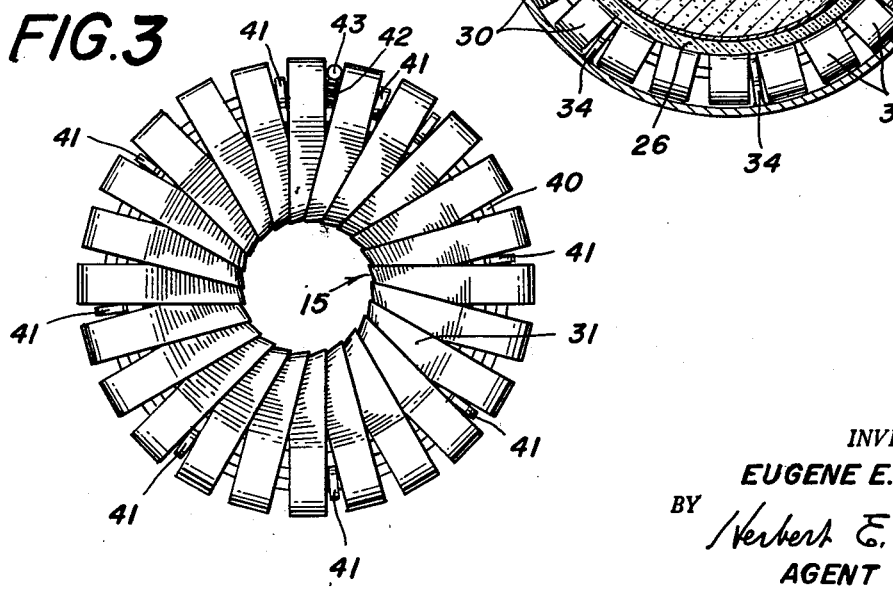
FIGURE 3 is an end view of the nozzle, as seen from 3—3 in FIGURE 1.

In the drawings, the rocket motor is designated in its entirety by the reference numeral 10, and comprises a casing 11 having a closure 12 at one end, and a nozzle 13 at the other end thereof. The nozzle 13 includes an end closure portion 14, and a throat section 15 of restricted diameter, which merges into a flared bell portion 16. Loaded within the casing 11 is a grain of solid propellant 20, having a central bore 22 which serves as a combustion port.

Disposed within the casing 11 adjacent the rear end closure portion 14 is an annular storage area 25, which is surrounded by a protective barrier 26 of thermal insulating material. The insulating material 26 is preferably separated from the propellant grain 20 by a sheet-metal shell 27.

Contained within the annular space 25 is a plurality of equidistant, angularly spaced rolls 30 of high temperature resistant tape 31. The tape 31 may be made of any heat resistant material, such as fibers of fused quartz, fiberglass, asbestos, metal wire or the like, and may be woven, felted, or bonded to form elongated tapes, preferably about one inch in width, which are wound on spools or bobbins 32 mounted on a flexible shaft 33. The flexible shaft 33 extends in a circle around the annular storage space 25, and is rotatably supported at intervals by bearings 34, which are mounted in any suitable manner on the inner surface of the casing 11.

The tapes 31 extend radially inwardly from the rolls 30 through a slot 35, and pass rearwardly through the nozzle 13. The tapes lie flat against the inner surface of the nozzle, and conform thereto, so as to form a protective layer covering substantially the entire inner surface of the nozzle. In passing through the throat section 15, the tapes 31 overlap one another, as best shown in FIGURE 6, to provide a double thickness of shielding material in this critical area. As the tapes pass outwardly through the flared bell portion 16, they diverge with respect to one another, so that at the outer lip 36 of the nozzle bell, they are substantially edge-to-edge, or even spaced apart slightly, as shown in FIGURE 1.

Mounted on the outer surface of the nozzle bell portion 16 adjacent the rear end thereof, is a plurality of equidistant, angularly spaced take-up spools, or bobbins 37, which are mounted on a flexible shaft 40. The flexible shaft 40 extends completely around the nozzle bell, and is rotatably supported at intervals by bearings 41. Each of the tapes 31 is attached at its outer end to one of the take-up spools 37, so that when the latter are rotatably driven in the proper direction, the tapes are wound up on the take-up spools 37 as they are withdrawn from the supply spools 32.

Mounted on the flexible shaft 40 between the two adjacent spools 37 is a pinion gear 42, which meshes with a worm 43 on the drive shaft 44 of a motor 45. The motor 45 is mounted on the outer surface of the nozzle bell 16 in front of the take-up spools 37, and is electrically connected to a suitable circuit which is energized at the time the rocket motor is fired.

During the burning period of the rocket motor, the motor 45 drives the flexible shaft 40 through the worm 43 and pinion 42, causing all of the take-up spools 37 to rotate in the direction causing the tapes 31 to be wound on the take-up spools. The take-up spools 37 are driven at a rate such that fresh tape is withdrawn from the supply spools 32 in the protected storage space 25 to replace the tape exposed to the high temperature combustion gases before the exposed tape has been destroyed by the hot gases. Thus, the nozzle 13 constantly renews its inner surface during the entire burning period of the motor before the tapes have been exposed long enough to be destroyed. In this manner, the nozzle is protected from erosion and can therefore be made of relatively inexpensive steel or other metal.

It is also within the scope of the present invention to use the frictional drag of the combustion gases issuing from the nozzle at high velocity to pull the tape 31 through the nozzle, in which case, the supply spools 32 would be restrained by suitable braking mechanism so as to pay out the tapes at the desired rate of speed. Alternatively, the supply spools 32 might be driven by motor means so as to pay out tape at the proper speed, and the take-up spools 37 could be spring driven so as to hold the tapes taut.

In another aspect of the invention, the tapes 31 are made with gradually increasing or decreasing thickness along their length, as shown at 31a in FIGURE 7, so that as the tapes are drawn over the inner surface of the throat section, 15, the increased thickness of the tapes will cause the throat opening to be reduced in diameter, thereby varying the thrust coefficient. In this manner, the thrust of the rocket may be modulated according to a predetermined program, and this is accomplished in a relatively simple and inexpensive manner.

While I have shown and described in considerable detail what I believe to be the preferred form of my invention, it will be understood by those skilled in the art that various changes may be made in the shape and arrangement of the several parts without departing from the broad scope of the invention.

I claim:

1. In a rocket motor, a nozzle comprising a shell defining a restricted throat portion and an outwardly flared bell portion, a protective layer of high temperature resistant material covering the inner surfaces of said throat and bell portions so as to shield them from the erosive effects of hot gases issuing from said nozzle at high velocity, means for moving the layer of protective material rearwardly through said nozzle at a rate such that the said protective layer is replaced before it has been destroyed by said hot gases.

2. In a rocket motor having a casing provided with a nozzle at the rear end thereof, a storage area within said casing protected from the combustion process during the burning period of the rocket motor, a supply of high temperature resistant material contained within said storage area and extending rearwardly therefrom through said nozzle, said high temperature resistant material conforming to and lying flat against the inner surface of said nozzle so as to cover the same and shield it against the erosive effects of high temperature combustion gases issuing at high velocity through said nozzle, means for drawing said material rearwardly through said nozzle during the burning period of the rocket motor at a rate such that fresh material from said protected storage area replaces material that has been exposed to said combustion gases before said exposed material has been destroyed, thereby providing said nozzle with shielding against erosion during substantially the entire burning period of the rocket motor.

3. The invention as defined in claim 2, wherein said last mentioned means is provided on the outside of said nozzle for drawing said high temperature resistant material rearwardly through said nozzle during the burning period of the rocket motor.

4. In a rocket motor, a nozzle comprising a shell defining a restricted throat portion and an outwardly flared bell portion, a plurality of elongated flexible tapes of high temperature resistant material disposed around the interior of said nozzle, said tapes being spaced apart around the diameter of the nozzle and extending lengthwise through the nozzle from one end thereof to the other, said tapes lying flat against the inner surface of said nozzle and overlapping one another at said throat portion, said tapes diverging with respect to one another as they pass outwardly through said flared bell portion, and means for moving said tapes lengthwise through said nozzle during the burning period of the rocket motor at a rate such that said nozzle shell is shielded by said tapes against erosion due to high temperature gases issuing at high velocity through said nozzle.

5. In a rocket motor having a casing provided with a nozzle at the rear end thereof, a storage area within said casing protected from the combustion process during the burning period of the rocket motor, a plurality of rolls of flexible tape of high temperature resistant material disposed within said storage area, the tape on each of said rolls passing through an aperture and extending rearwardly through said nozzle, said tapes conforming to and lying flat against the inner surface of said nozzle so as to cover the same and shield it against the erosive effects of high temperature combustion gases issuing at high velocity through said nozzle, means for drawing said tapes rearwardly through said nozzle during the burning period of the rocket motor at a rate such that fresh tape from said protected storage area replaces tape that has been exposed to said combustion gases before said exposed tape has been destroyed, thereby providing said nozzle with shielding against erosion during substantially the entire burning period of the rocket motor.

6. In a rocket motor having a casing provided with a nozzle at the rear end thereof, a storage area within said casing protected from the combustion process during the burning period of the rocket motor, a plurality of rolls of flexible tape of high temperature resistant material disposed within said storage area, the tape on each of said rolls passing through an aperture and extending rearwardly through said nozzle, said tapes conforming to and lying flat against the inner surface of said nozzle so as to cover the same and shield it against the erosive effects of high temperature combustion gases issuing at high velocity through said nozzle, a plurality of take-up spools rotatably supported on said nozzle adjacent the rear end thereof, said take-up spools being spaced apart around the periphery of said nozzle and each of said spools being connected to one of said tapes, and means for rotatably driving said take-up spools during the burning period of the rocket motor, so that fresh tape from said protected storage area is drawn rearwardly over the inner surface of said nozzle to replace tape that has been exposed to said combustion gases before said exposed tape has been destroyed, thereby providing said nozzle with shielding against erosion during substantially the entire burning period of the rocket motor.

7. The invention as defined in claim 6, wherein said tapes vary substantially in thickness along the length thereof so as to vary the diameter of the nozzle throat opening during the burning period of the rocket motor, for the purpose of modulating the thrust of the rocket motor according to a predetermined program.

8. In a rocket motor having a casing provided with a nozzle at the rear end thereof, said nozzle including a throat portion and a flared bell portion, a storage area surrounding said nozzle adjacent the inner end thereof, said storage area being protected from the combustion process during the burning period of the rocket motor, a supply of high temperature resistant material contained within said storage area and extending through said nozzle from one end thereof to the other, said material conforming to and lying flat against the inner surface of said nozzle so as to cover the same, motor-driven means operable to draw said material rearwardly through said nozzle from said protected storage area, said material varying in thickness along the length of its travel so as to vary the diameter of said nozzle throat portion during the burning period of the rocket motor and thereby modulate the thrust of the rocket motor according to a predetermined program.

9. In a rocket motor having a casing loaded with a solid propellant grain, and a nozzle comprising a throat portion of restricted diameter and a flared bell portion, an annular storage space within said casing surrounding said nozzle throat portion, insulating means protecting said storage space from the combustion process during the burning period of the rocket motor, a plurality of equidistant, angularly spaced supply spools rotatably supported within said annular storage space, each of said supply spools having a tape of heat resistant material wound thereon each of said tapes passing from said storage space through a narrow slot and extending rearwardly through said nozzle, said tapes overlapping one another as they pass through said throat portion, and diverging with respect to one another as they pass through said flared bell portion, said tapes lying flat against the inner surface of said nozzle and covering the same to protect it against erosion from high temperature combustion gases issuing from the nozzle at high velocity, a plurality of take-up spools rotatably mounted on the outer surface of said nozzle adjacent the rear end thereof, each of said take-up spools having the outer end of one of said tapes attached thereto, and motor means for rotatably driving said take-up spools during the burning period of the rocket motor so as to draw fresh tape from said protected supply spools through said nozzle at a rate to replace tape that has been exposed to said combustion gases before said exposed tape has been destroyed, thereby providing said nozzle with shielding against erosion during substantially the entire burning period of the rocket motor.

References Cited in the file of this patent

UNITED STATES PATENTS

| | | |
|---|---|---|
| 2,206,057 | Skinner | July 2, 1940 |
| 2,447,200 | Miller | Aug. 17, 1948 |
| 2,539,404 | Crutchfield et al. | Jan. 30, 1951 |
| 2,835,107 | Ward | May 20, 1958 |